US012165389B2

(12) United States Patent
Miller et al.

(10) Patent No.: US 12,165,389 B2
(45) Date of Patent: Dec. 10, 2024

(54) MACHINE LEARNING MODEL TRAINING CORPUS APPARATUS AND METHOD

(71) Applicant: General Electric Company, Schenectady, NY (US)

(72) Inventors: James Vradenburg Miller, Clifton Park, NY (US); Walter V. Dixon, Delanson, NY (US); Nihaar Shah, New York City, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/871,247

(22) Filed: Jul. 22, 2022

(65) Prior Publication Data

US 2024/0029407 A1    Jan. 25, 2024

(51) Int. Cl.
  *G06V 10/774* (2022.01)
  *G06T 15/10* (2011.01)

(52) U.S. Cl.
  CPC ............ *G06V 10/774* (2022.01); *G06T 15/10* (2013.01)

(58) Field of Classification Search
  CPC .............................. G06V 10/774; G06T 15/10
  See application file for complete search history.

(56) References Cited

U.S. PATENT DOCUMENTS

| | | | | |
|---|---|---|---|---|
| 7,092,860 B1 * | 8/2006 | Wasserman | ............ | G06T 17/00 700/59 |
| 8,085,270 B2 * | 12/2011 | Kim | ......................... | G06T 15/02 345/441 |
| 10,192,023 B2 | 1/2019 | Byers | | |
| 10,262,236 B2 | 4/2019 | Lim | | |
| 10,262,404 B2 | 4/2019 | Stancato | | |
| 10,846,444 B2 | 11/2020 | Byers | | |
| 10,860,748 B2 | 12/2020 | Wheeler | | |
| 11,094,134 B1 * | 8/2021 | Fallin | .................... | G06T 15/506 |
| 2019/0130603 A1 * | 5/2019 | Sun | ........................ | G06N 3/045 |

(Continued)

FOREIGN PATENT DOCUMENTS

CN             113785302            12/2021

OTHER PUBLICATIONS

Benjamin Planche et al: "DepthSynth: Real-Time Realistic Synthetic Data Generation from CAD Models for 2.5D Recognition", Feb. 27, 2017 (Feb. 27, 2017), XP055366521, DOI: 10.1109/3DV. 2017.00011 Retrieved from the Internet: URL:https://arxiv.org/pdf/1702.08558.pdf.

(Continued)

*Primary Examiner* — Phi Hoang
(74) *Attorney, Agent, or Firm* — Fitch, Even, Tabin & Flannery LLP

(57) ABSTRACT

A control circuit accesses three-dimensional image information for a given three-dimensional object. The control circuit accesses a selection corresponding to a feature of the three-dimensional object, and then automatically generates a plurality of synthetic images of the three-dimensional object as a function of the three-dimensional and the selection of the aforementioned feature. By one approach, these synthetic images include supplemental visual emphasis corresponding to the aforementioned feature. The generated plurality of synthetic images can then be used as a training corpus when training a machine learning model.

20 Claims, 4 Drawing Sheets

(56) References Cited

U.S. PATENT DOCUMENTS

| | | | |
|---|---|---|---|
| 2020/0184119 A1 | 6/2020 | Machalica | |
| 2020/0184121 A1 | 6/2020 | Machalica | |
| 2020/0184124 A1 | 6/2020 | Machalica | |
| 2021/0097691 A1* | 4/2021 | Liu | G06V 10/764 |
| 2021/0366153 A1* | 11/2021 | Hoelscher | G06V 20/653 |
| 2022/0188566 A1* | 6/2022 | Ge | G06F 18/2178 |
| 2022/0301129 A1* | 9/2022 | Sharifi | G06N 3/08 |

OTHER PUBLICATIONS

Matthew Z Wong et al: "Synthetic dataset 1-9 generation for object-to-model deep learning in industrial applications", axiv.org, Cornell University Library, 201 Olin Library Cornell University Ithaca, NY 14853, Sep. 24, 2019 (Sep. 24, 2019), XP081481173.
Moore Matt: "Generating Large, Synthetic, 1-9 Annotated, & Photorealistic Datasets for Computer Vision", Sep. 25, 2018 (Sep. 25, 2018), XP093101815, Retrieved from the Internet: URL:https://towardsdatascience.com/generating-large-synthetic-annotated-photorealistic-datasets-for-computer-vision-ffac6f50a29c.

* cited by examiner

MACHINE LEARNING MODEL TRAINING CORPUS APPARATUS AND METHOD

TECHNICAL FIELD

These teachings relate generally to machine learning models and more particularly to the training thereof.

BACKGROUND

Machine learning comprises a branch of artificial intelligence. Machine learning typically employs learning algorithms such as Bayesian networks, decision trees, nearest-neighbor approaches, and so forth, and the process may operate in a supervised or unsupervised manner as desired. Deep learning (also sometimes referred to as hierarchical learning, deep neural learning, or deep structured learning) is a subset of machine learning that employs networks capable of learning (often unsupervised) from data that may be unstructured or unlabeled. Deep learning architectures include deep neural networks, deep belief networks, recurrent neural networks, and convolutional neural networks.

Many machine learning algorithms build a so-called "model" based on sample data, known as training data or a training corpus, in order to make predictions or decisions without being explicitly programmed to do so.

BRIEF DESCRIPTION OF THE DRAWINGS

Various needs are at least partially met through provision of the machine learning model training corpus apparatus and method described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
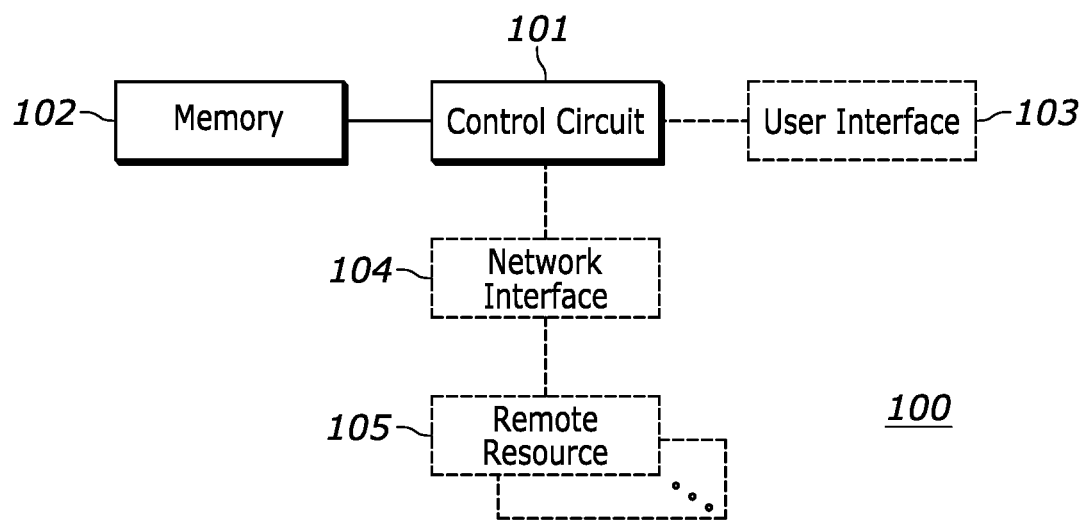
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Supervised learning artificial intelligence methods often use annotated or labeled data to learn the desired response to a given input. When training image-based supervised learning artificial intelligence methods, the annotations and labels are sometimes in the form of a labelmap, with labels at each pixel defining a location, boundary, or region of an object or event.

When lacking sufficient image data to train a particular task, synthetically generated data can sometimes be substituted. When the artificial intelligence method is to be applied to images of manufactured objects, computer graphics renderings of the object can serve as the synthetic image data. Computer graphics renderings allow for the position and pose of the object to be varied during the synthetic data generation.

Computer graphic rendering approaches for synthetic data generation for artificial intelligence training focuses on realistic renderings that typically do not address the problem of emphasizing specific geometric features that lead to subtle yet task-important image features. Accordingly, computer graphics renderings may not sufficiently highlight the geometric features that the artificial intelligence method should aim to recognize to trigger the desired response. To address this concern, by one prior art approach, one generates a large corpus of synthetic images and then one or more expert humans manually label the features of interest in the synthetic images to form the data needed to train, for example, a machine learning model.

Such an approach, however, can be extremely time consuming and relatively expensive as well. And even expert humans can make mistakes, especially when executing a more or less similar task over and over again.

These are all significant challenges in the context of aviation application settings where machine learning models often work with very high precision mechanical parts and assemblies that are potentially imaged from a wide variety of fields of view.

Generally speaking, the various aspects of the present disclosure can be employed with a control circuit that accesses three-dimensional image information for a given three-dimensional object. The control circuit accesses a selection corresponding to a feature of the three-dimensional object, and then automatically generates a plurality of synthetic images of the three-dimensional object as a function of the three-dimensional image information and the selection of the aforementioned feature. By one approach, these synthetic images include supplemental visual emphasis corresponding to the aforementioned feature. The generated plurality of synthetic images can then be used as a training corpus when training a machine learning model.

By one approach, the aforementioned three-dimensional image information comprises three-dimensional computer aided design (CAD) information. In such a case, automatically generating the aforementioned plurality of synthetic images can comprise using a CAD process to which the three-dimensional CAD information is native.

These teachings will accommodate generating a relatively large plurality of such synthetic images. For example, the generated plurality may comprise at least 100,000 synthetic images, at least 1 million synthetic images, or even more as desired.

By one approach, the aforementioned accessed selection may comprise a user selection. Such a selection may be entered by a user via a corresponding user interface, such as a cursor or a touch-responsive display.

By one approach, the aforementioned supplemental visual emphasis comprises a color. By one approach, the supplemental visual emphasis comprises a part of an annotation layer.

A machine learning model trained as described above can serve, for example, to process images as desired.

These teachings will accommodate having an expert (or experts) annotate three-dimensional geometric models (for example, CAD models) by labeling key locations, edges, corners, fillets, and so forth that correspond to the rendered object. These geometry annotations can then be leveraged by these teachings to emphasize, for example, geometric features during follow-on synthetic image generation. Since the annotations are associated with the three-dimensional geometry, it will be appreciated that the aforementioned emphasis can consider the position and pose of the object in each generated image and leverage the native hidden surface removal capabilities of the rendering engine to only apply the emphasis where the observer would have been able to see the feature.

These teachings allow annotations to be applied automatically, quickly, and with great precision and accuracy during a synthetic image generation process. That speed contrasts sharply with the prior practice of generating a corpus of synthetic images and then having experts manually label the features of interest in each such image. By annotating the three-dimensional geometries once, and leveraging the computer graphics rendering engine to construct image level annotations, the manual annotation of a large corpus of computer-generated images is avoided. As one example, in one application setting each synthesized image may be annotated three thousand times faster than with manual image annotation. The generated annotations also tend to be more consistently accurate than what is achieved with manual image annotations.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description. Referring now to the drawings, and in particular to FIG. 1, an illustrative apparatus 100 that is compatible with many of these teachings will now be presented.

For the sake of an illustrative example it will be presumed here that a control circuit 101 of choice carries out the actions, steps, and/or functions of this process. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

In this illustrative example, the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101). It will also be understood that this memory 102 may comprise a plurality of physically discrete memories that, in the aggregate, store the pertinent information that corresponds to these teachings.

In addition to other information as described herein, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

By one optional approach, the control circuit 101 operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

By another optional approach (in lieu of the foregoing or in combination therewith), the control circuit 101 may operably couple to a network interface 104. So configured the control circuit 101 can communicate with other elements (both within the apparatus 100 and external thereto) via the network interface 104. For example, the control circuit 101 may communicate with one or more remote resources 105 in this way. Network interfaces, including both wireless and non-wireless platforms, are well understood in the art and require no particular elaboration here.

Figure 2:
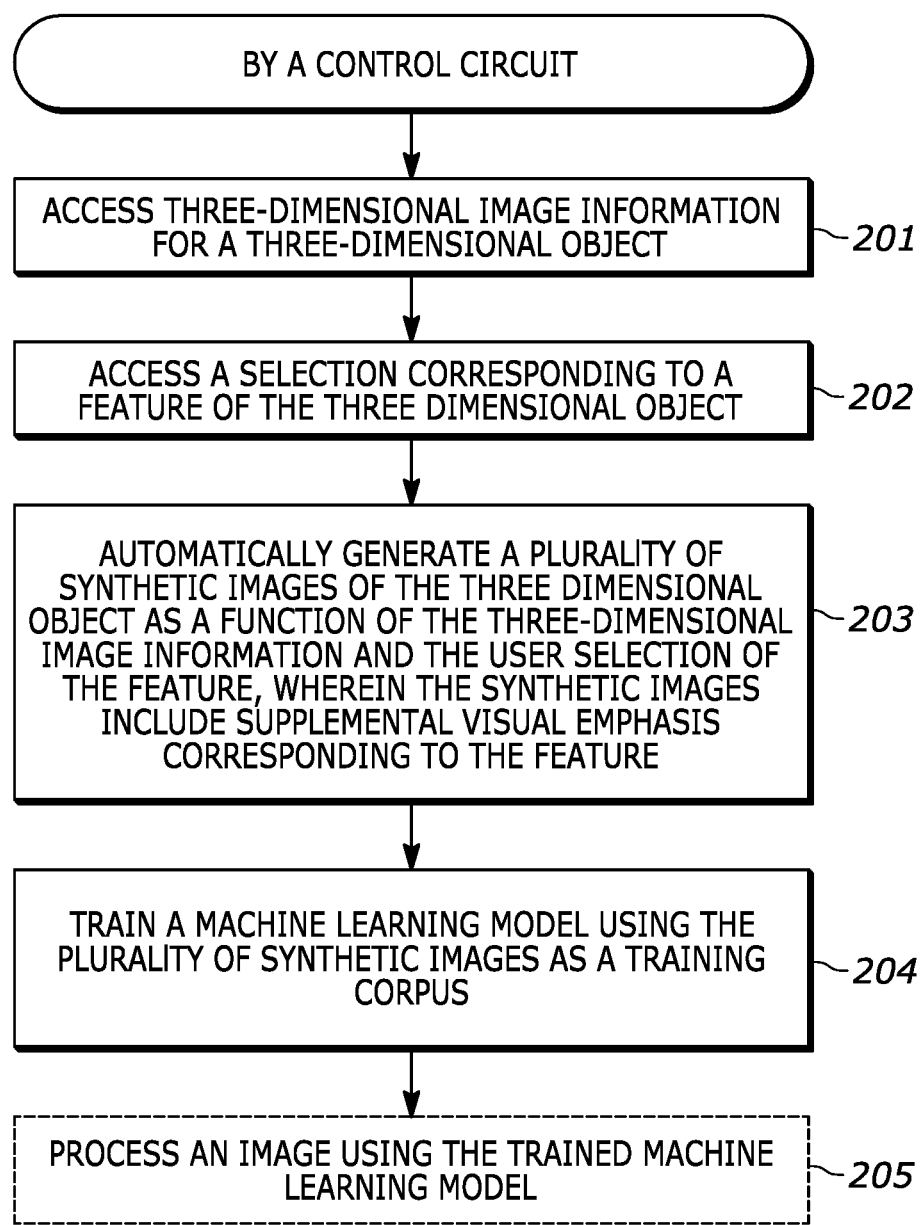
FIG. 2 comprises a flow diagram as configured in accordance with various embodiments of these teachings.

Referring now to FIG. 2, a process that can be carried out by the aforementioned control circuit 101 will be described. It will be appreciated that the details of this process are intended to serve an illustrative purpose and are not to be construed as suggesting any particular limitations with respect to these teachings.

At block 201, the control circuit accesses three-dimensional image information for a three-dimensional object. As one illustrative example in these regards, that three-dimensional image information can comprise three-dimensional computer aided design or drawing information. The three-dimensional object itself can be essentially any three-dimensional object. This includes real-world, physical objects as well as not-yet-existing objects and even fanciful objects that would be difficult or impossible to realize in the real world. As used herein, it will be understood that the expressions "three-dimensional image" and "three-dimensional image information" can refer to three-dimensional images such as computed tomography or ultrasound images but can also refer to three-dimensional computer aided drawing (CAD) model files, three-dimensional geometric scanned models, and so forth. With the foregoing in mind, and by way of a few examples, these three-dimensional images can be sourced in the first instance from a CAD program, from three-dimensional scanners that employ any of a variety of scanning technologies (including stereo imaging, structured light, time of flight, and so forth), computed tomography and/or ultrasound imaging systems, touch probes (such as a Faro® Arm or Romer™ system), and so forth.

At block 202, this process then provides for accessing a selection that corresponds to a feature of the three-dimensional object. By one approach, this can comprise intaking a selection of that feature via, for example, the aforementioned user interface 103. As one simple example in these regards, a user may effect that selection by tracing over the feature as displayed on the user interface 103 using an appropriate input tool. The selection may be visually indicated, for example, by use of a corresponding contrasting color.

Figure 3:
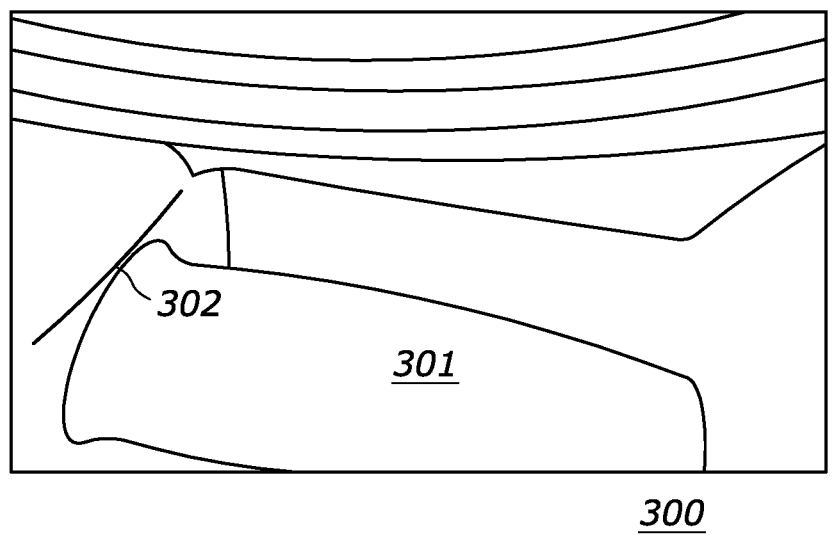
FIG. 3 comprises a screen shot as configured in accordance with various embodiments of these teachings.
Figure 5:
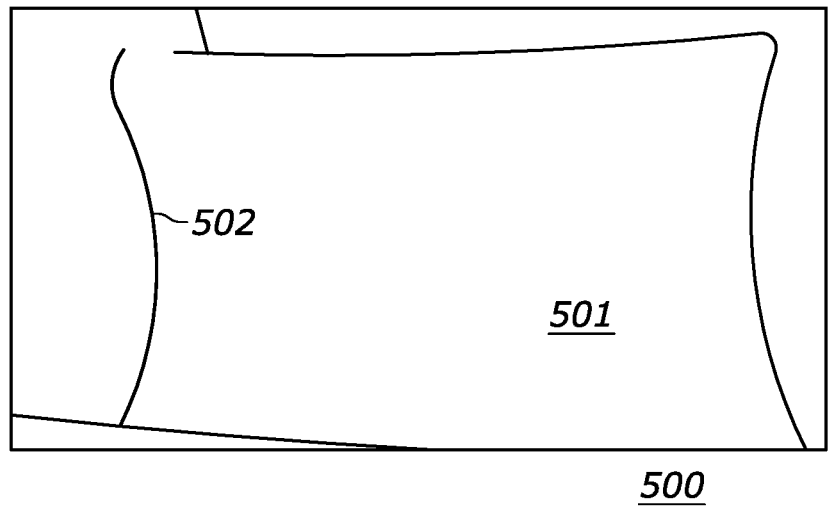
FIG. 5 comprises a screen shot as configured in accordance with various embodiments of these teachings.

FIG. 3 presents one illustrative example in these regards. This screenshot 300 presents some three-dimensional CAD geometry 301. In this example, a user has annotated the foregoing image by highlighting a specific platform edge 302. FIG. 5 presents another illustrative example in these regards. This screenshot 500 presents a different three-dimensional CAD geometry 501 upon which the user has annotated the image by highlighting a fillet feature 502. These teachings will accommodate having this imagery be as detail rich (or as simple and devoid of detail) as may be appropriate to suit the needs of a given application setting. For example, surface shading and/or texture features may be included (or not) as desired. Also, these images may be as realistic (or not) as desired.

After accessing the aforementioned feature-based selection, at block 203 the control circuit 101 automatically generates a plurality of synthetic images of the three-dimensional object as a function of the three-dimensional image information and that aforementioned selection of the aforementioned feature. These synthetic images may comprise, for example, views of the three-dimensional object from various incrementally-different fields of view. More particularly, most or all of these synthetic images can include in a highlighted and/or annotated manner the aforementioned user-highlighted feature (to the extent that the latter would otherwise be visible in the corresponding view).

When the three-dimensional image information comprises three-dimensional geometric models, such as three-dimensional CAD models/information, the plurality of synthetic images can be automatically generated using the CAD process to which the three-dimensional CAD information is native.

The number of synthetic images so generated can vary with the needs of the application setting. These teachings are readily able to quickly generate, however, large numbers of different synthetic images. As one example, these teachings will facilitate automatically generating at least 100,000 synthetic images. As another example, these teachings will support generating at least 1 million synthetic images.

Pursuant to these teachings, at least some of these synthetic images include supplemental visual emphasis corresponding to the aforementioned feature/annotation as previously selected by the user. In particular, whenever and to whatever extent the aforementioned feature is otherwise visible in a particular synthetic image, that feature can be visually emphasized. By one approach, that supplemental visual emphasis can comprise a color, such as a color that contrasts with the underlying synthetic image itself. By one approach, that supplemental visual emphasis comprises a part of an annotation layer for the synthetic image.

Figure 4:
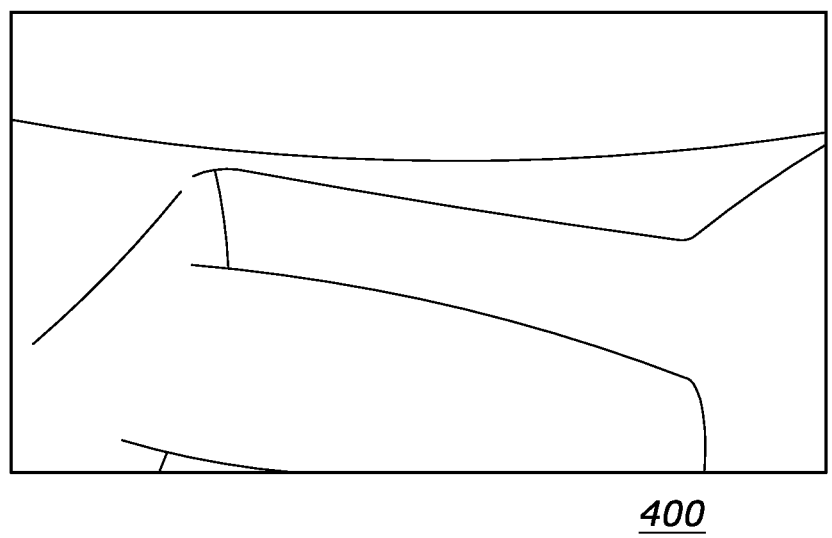
FIG. 4 comprises a screen shot of a synthetic image as configured in accordance with various embodiments of these teachings.
Figure 6:
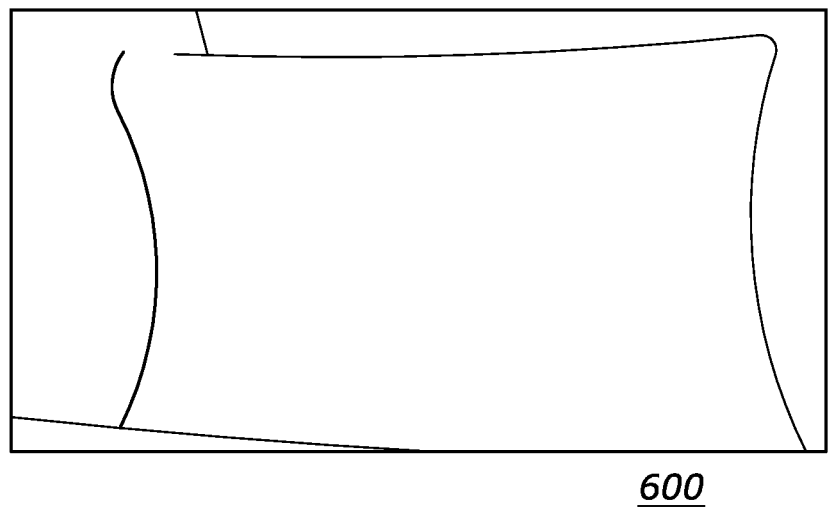
FIG. 6 comprises a screen shot of a synthetic image as configured in accordance with various embodiments of these teachings.

FIG. 4 presents an illustrative example of a synthetic image 400 that corresponds to the image described above with respect to FIG. 3. In this example, the synthetic image 400 renders depth and silhouette edges of the original three-dimensional geometry with the annotated edge added after rendering. Similarly, FIG. 6 presents an illustrative example of a synthetic image 600 that corresponds to the image described above with respect to FIG. 5. Again, this synthetic image 600 comprises a rendering of depth and silhouette edges of the original three-dimensional geometry with the annotated fillet added after that rendering. To be clear, the one original user-highlighted/annotated image serves to generate a plurality of corresponding images of the object at, for example, various angles and/or depths of field in which the user-selected feature(s) (when present in a particular view in whole or in part) is highlighted in some manner to facilitate its recognition by the machine learning model during training.

In both of the foregoing images, the features appear in a color (black) that contrasts sharply in comparison to the background (which is uniformly white). Essentially the same result can be achieved, if desired, by reversing that color scheme such that the background is black while the depicted features are white. These teachings will accommodate other approaches in these regards. For example, other colors may be employed. These teachings will also accommodate using different contrasting colors for the features themselves (using, for example, the color red to highlight a most important feature and the color black to indicate other depicted features).

When using different colors (or any other distinguishing indicator) for depicted features, these teachings will also accommodate using different colors/indicators to identify two or more different features that are both selected by the user as being important, but where one feature may be considered more important than another depicted feature. That latter approach may be useful when the model to be trained is configured to weight different selected features differently from one another. In lieu of the foregoing or in combination therewith, it will be appreciated that colors/ indicators can be employed to serve as a labelmap that corresponds to the training process.

By one approach the aforementioned synthetically constructed images may utilize different pixel values to represent different features/label categories. For example, a first feature may use one pixel value, and second, different feature may use a different pixel value, and so forth. When visualizing these images, different colors may be used to represent different corresponding pixel values. It is possible that a human may not easily distinguish distinct pixel values/labels that share a similar color representation. To make human interpretation easier, a palette or colormap can be used during visualization to increase the contrast/color difference between features that share similar (but not identical) pixel values/labels. After rendering the synthetic image with the desired features/pixel values, by one approach these teachings will accommodate a training scheme that allows for multiple pixel/label values to be combined to define a specific feature or set of features, or to ignore/mask specific features, or even to prioritize specific values/features to achieve the objective of a specific training task.

Accordingly, and by way of example, these teachings can correspond to annotating three-dimensional geometric models such as CAD models or, in lieu thereof, three-dimensional surface models and/or three-dimensional point clouds that result from three-dimensional scanning (using, for example, stereo imaging, structured-light, time of flight, touch probes, and any other useful methodology in these regards). It will be understood that the foregoing includes three-dimensional surface models extracted from volumetric image data (including computed tomography, magnetic resonance, ultrasound, positron emission tomography, and so forth). And notwithstanding the specificity of the foregoing examples, for many useful applications any of a variety of other three-dimensional images may serve as a direct or indirect surrogate for a CAD model.

At block 204, this process then provides for training the machine learning model using the plurality of synthetic images as a training corpus. That training may be done exclusively using those synthetic images, or that training may be supplemented with other images as desired. In many application settings, the synthetic images may be so utilized without converting those images to hardcopy. By one approach, the digital file for a given synthetic image can be discarded (for example, within only a few seconds) after having been used to train a given machine learning model. (These teachings are highly flexible in practice and will accommodate any of a wide variety of different machine learning model approaches. As these teachings are not overly sensitive to the selection of any particular machine learning model, further details regarding such models is not provided here for the sake of brevity.)

These teachings will accommodate selecting and annotating any of a wide variety of features. A non-exhaustive listing in these regards includes, but it not limited to, edges, corners, creases, fillets, slots, holes, rims, specific patches or areas of a surface, and so forth. These teachings will also accommodate individual, discrete parts of something, such as wheels, the hood or fenders of an automobile, an output shaft of a motor, and so forth.

Once trained, the machine learning model can be optionally utilized to process, for example, one or more desired images as denoted by optional block 205. As but one non-limiting example in these regards, such a model could be used in a turbine blade inspection robot to facilitate making accurate measurements of key components and/or between a key feature and one or more other surfaces.

These teachings will accommodate generating some or all of the aforementioned training corpus inside the training loop itself. These teachings will also accommodate pre-generating part or all of the training corpus prior to engaging the training loop for the machine learning model. It will be appreciated that these teachings can be applied to avoid presenting any identical images to the machine learning model during training to thereby eliminate any bias that can be attributed to such redundancy.

For at least the most part, the foregoing examples at least imply a visual representation captured via emitted and/or reflected light/radiation. These teachings are highly flexible in practice, however, and will accommodate other application settings and modalities that do not include, strictly speaking, a visual modality. By one approach, for example, these teachings will accommodate synthetically generating ultrasound signals (for example, as amplitude versus time per element) that might have a visual representation when processed but where it might be useful to train a machine learning model based on those underlying signals rather than on any visual representation thereof.

As another example, the intent may be to train the machine learning model with respect to a particular thermal signature in conjunction with the three-dimensional geometry at hand. That thermal signature could therefore serve as the basis of the aforementioned feature.

And as yet another example, these teachings will accommodate a separate modality, such as a target-sensing modality (such as, for example, a time of flight modality). Such an approach can be useful in the context of training a machine learning model to process/recognize signals in the particular sensing modality by having the aforementioned feature (i.e., the annotation) serve to generate an enhanced response in that modality.

As another example of the flexibility of these teachings, the foregoing annotations need not be visual in nature (nor do the annotations necessarily need to derive from specific and direct user input). For example, there may be programmatic feature enhancements in the CAD tool that can be leveraged/used to annotate the three-dimensional model. By way of illustration, certain structures in the model may be flagged (such as a particular hole or the location of a shim in the skin of an airplane).

Additional aspects of the disclosure are provided by the subject matter of the following clauses:

1. A method comprising:
   by a control circuit:
   accessing three-dimensional image information for a three-dimensional object;
   accessing a selection corresponding to a feature of the three-dimensional object;
   automatically generating a plurality of synthetic images of the three-dimensional object as a function of the three-dimensional image information and the selection of the feature, wherein the synthetic images include supplemental visual emphasis corresponding to the feature; and
   training a machine learning model using the plurality of synthetic images as a training corpus.
2. The method of clause 1 wherein the three-dimensional image information comprises three-dimensional computer aided design (CAD) information.

3. The method of clause 2 wherein automatically generating the plurality of synthetic images comprises using a CAD process to which the three-dimensional CAD information is native.
4. The method of clause 1 wherein the plurality of synthetic images include views of the three-dimensional object from differing points of view.
5. The method of clause 1 wherein the plurality of synthetic images include views of the three-dimensional object that include depth and silhouette edges of the three-dimensional object.
6. The method of clause 1 wherein the supplemental visual emphasis comprises a color.
7. The method of clause 1 wherein the supplemental visual emphasis comprises a part of an annotation layer.
8. An apparatus comprising:
　a control circuit configured to:
　　access three-dimensional image information for a three-dimensional object;
　　access a selection corresponding to a feature of the three-dimensional object;
　　automatically generate a plurality of synthetic images of the three-dimensional object as a function of the three-dimensional image information and the selection of the feature, wherein the synthetic images include supplemental visual emphasis corresponding to the feature; and
　　train a machine learning model using the plurality of synthetic images as a training corpus.
9. The apparatus of clause 8 wherein the three-dimensional image information comprises three-dimensional computer aided design (CAD) information.
10. The apparatus of clause 9 wherein the control circuit is configured to automatically generate a large plurality of synthetic images by using a CAD process to which the three-dimensional CAD information is native.
11. The apparatus of clause 8 wherein the plurality of synthetic images include views of the three-dimensional object from differing points of view.
12. The apparatus of clause 8 wherein the plurality of synthetic images include views of the three-dimensional object that include depth and silhouette edges of the three-dimensional object.
13. The apparatus of clause 8 wherein the supplemental visual emphasis comprises a color.
14. The apparatus of clause 8 wherein the supplemental visual emphasis comprises a part of an annotation layer.
15. A method comprising:
　by a control circuit:
　　processing an image using a machine learning model, wherein the machine learning model was trained by:
　　　accessing three-dimensional image information for a three-dimensional object;
　　　accessing a selection corresponding to a feature of the three-dimensional object;
　　　automatically generating a plurality of synthetic images of the three-dimensional object as a function of the three-dimensional image information and the selection of the feature, wherein the synthetic images include supplemental visual emphasis corresponding to the feature; and
　　　training the machine learning model using the plurality of synthetic images as a training corpus.
16. The method of clause 15 wherein the three-dimensional image information comprises three-dimensional computer aided design (CAD) information.
17. The method of clause 16 wherein automatically generating the plurality of synthetic images comprises using a CAD process to which the three-dimensional CAD information is native.
18. The method of clause 15 wherein the plurality of synthetic images include views of the three-dimensional object that include depth and silhouette edges of the three-dimensional object.
19. The method of clause 15 wherein the supplemental visual emphasis comprises a color.
20. The method of clause 15 wherein the supplemental visual emphasis comprises a part of an annotation layer.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the inventive concept.

What is claimed is:
1. A method comprising:
　by a control circuit:
　　accessing three-dimensional image information for a three-dimensional object;
　　receiving a user selection of a geometric feature of the three-dimensional object, which geometric feature is to be emphasized;
　　automatically generating a plurality of synthetic images of the three-dimensional object as a function of the three-dimensional image information and the user selection of the geometric feature, wherein the synthetic images include supplemental visual emphasis corresponding to the geometric feature; and
　　training a machine learning model using the plurality of synthetic images that include the supplemental visual emphasis as a training corpus.
2. The method of claim 1 wherein the three-dimensional image information comprises three-dimensional computer aided design (CAD) information.
3. The method of claim 2 wherein automatically generating the plurality of synthetic images comprises using a CAD process to which the three-dimensional CAD information is native.
4. The method of claim 1 wherein the plurality of synthetic images include views of the three-dimensional object from differing points of view.
5. The method of claim 1 wherein the plurality of synthetic images include views of the three-dimensional object that include depth and silhouette edges of the three-dimensional object.
6. The method of claim 1 wherein the supplemental visual emphasis comprises a color.
7. The method of claim 1 wherein the supplemental visual emphasis comprises a part of an annotation layer.
8. An apparatus comprising:
　a control circuit configured to:
　　access three-dimensional image information for a three-dimensional object;
　　receive a user selection of a geometric feature of the three-dimensional object, which geometric feature is to be emphasized;
　　automatically generate a plurality of synthetic images of the three-dimensional object as a function of the three-dimensional image information and the user selection of the geometric feature, wherein the synthetic images include supplemental visual emphasis corresponding to the geometric feature; and train a machine learning model using the plurality of synthetic images that include the supplemental visual emphasis as a training corpus.

9. The apparatus of claim 8 wherein the three-dimensional image information comprises three-dimensional computer aided design (CAD) information.

10. The apparatus of claim 9 wherein the control circuit is configured to automatically generate the large plurality of synthetic images by using a CAD process to which the three-dimensional CAD information is native.

11. The apparatus of claim 8 wherein the plurality of synthetic images include views of the three-dimensional object from differing points of view.

12. The apparatus of claim 8 wherein the plurality of synthetic images include views of the three-dimensional object that include depth and silhouette edges of the three-dimensional object.

13. The apparatus of claim 8 wherein the supplemental visual emphasis comprises a color.

14. The apparatus of claim 13 wherein the supplemental visual emphasis comprises a part of an annotation layer.

15. A method comprising:
by a control circuit:
processing an image using a machine learning model, wherein the machine learning model was trained by:
accessing three-dimensional image information for a three-dimensional object;
receiving a user selection of a geometric feature of the three-dimensional object, which geometric feature is to be emphasized;
automatically generating a plurality of synthetic images of the three-dimensional object as a function of the three-dimensional image information and the user selection of the geometric feature, wherein the synthetic images include supplemental visual emphasis corresponding to the geometric feature; and
training the machine learning model using the plurality of synthetic images that include the supplemental visual emphasis as a training corpus.

16. The method of claim 15 wherein the three-dimensional image information comprises three-dimensional computer aided design (CAD) information.

17. The method of claim 16 wherein automatically generating the plurality of synthetic images comprises using a CAD process to which the three-dimensional CAD information is native.

18. The method of claim 15 wherein the plurality of synthetic images include views of the three-dimensional object that include depth and silhouette edges of the three-dimensional object.

19. The method of claim 15 wherein the supplemental visual emphasis comprises a color.

20. The method of claim 19 wherein the supplemental visual emphasis comprises a part of an annotation layer.

* * * * *